April 3, 1962 L. PÉRAS 3,028,020
AUTOMATIC DEVICE FOR FEEDING WORKPIECES TO MACHINE-TOOLS
Filed Sept. 16, 1957 3 Sheets-Sheet 1
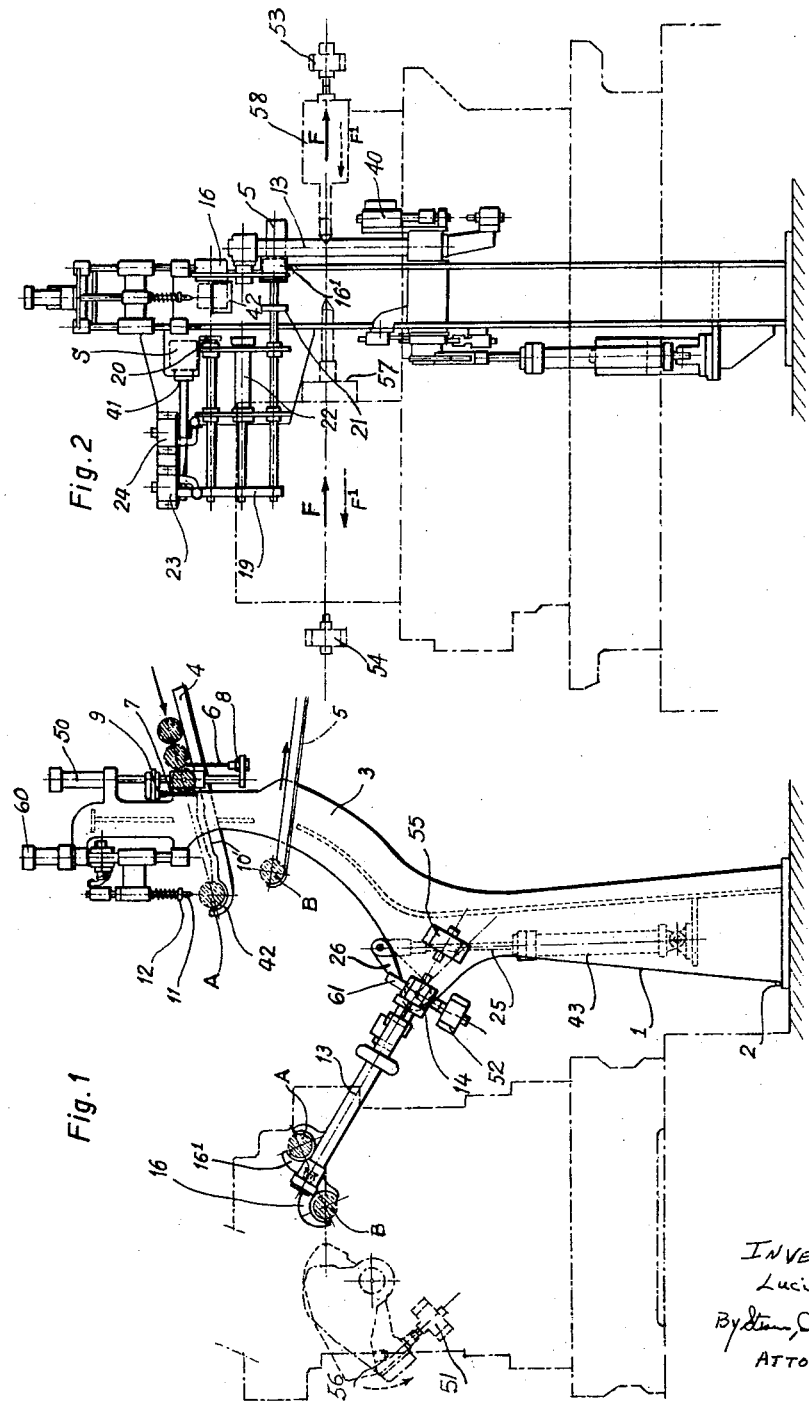
INVENTOR
Lucien Péras
ATTORNEYS

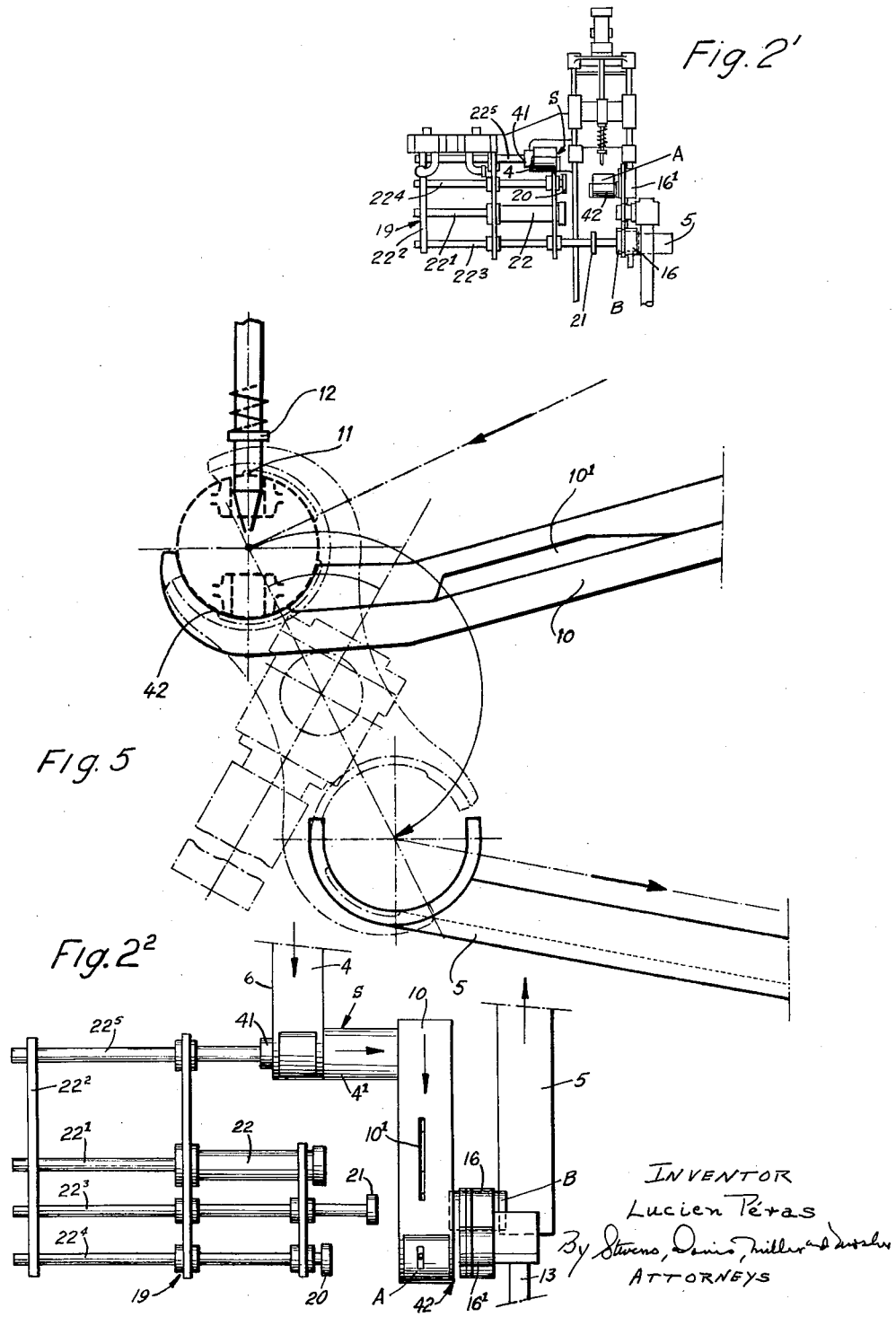

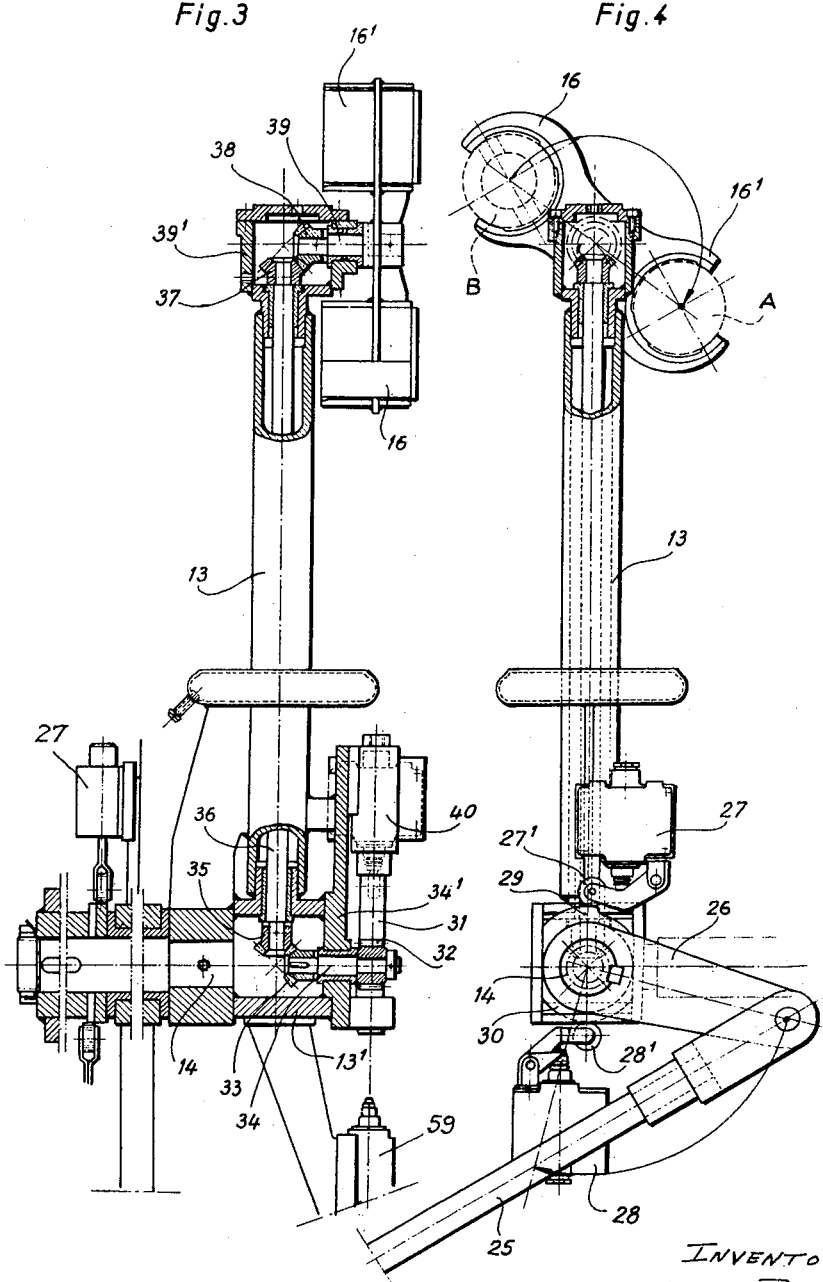

United States Patent Office 3,028,020
Patented Apr. 3, 1962

3,028,020
AUTOMATIC DEVICE FOR FEEDING WORK-PIECES TO MACHINE-TOOLS
Lucien Péras, Billancourt, France, assignor to Regie Nationale des Usines Renault, Billancourt (Seine), France
Filed Sept. 16, 1957, Ser. No. 684,155
Claims priority, application France Sept. 21, 1956
11 Claims. (Cl. 214—1)

This invention relates to an automatic device for feeding workpieces to machine-tools and has for its main object to locate on a machine-tool, for example a lathe, in a suitable machining position, a continuous series of workpieces, for example engine pistons, in order for the machine-tool to perform an operation such as turning the piston-ring grooves, and subsequently remove these workpieces, all these movements being synchronized or accomplished in proper time relationship under the control of the tool-carriage of the lathe through the medium of remote-control means.

In order to afford a clearer understanding of the manner in which the present invention may be carried out in practice, reference will now be made to the attached drawings forming part of this specification and illustrating diagrammatically by way of example a typical embodiment of the invention. In the drawings:

FIGURE 1 is an elevational view of the automatic device constituting the subject-matter of this invention;

FIGURE 2 is a side view of the device;

FIGURE 2¹ is a detailed elevational view of the upper portion of the device, as shown in FIGURE 1 and showing the pushing assembly of the device;

FIGURE 2² is a schematic fragmentary plan view showing details of the pushing assembly as well as the piston feed and delivery means with which the pushing assembly cooperates;

FIGURES 3 and 4 are detailed views showing on a larger scale the oscillating arm of the device;

FIGURE 5 is a view showing on a larger scale the feed and delivery ramps.

Referring to the drawings and more particularly to FIGURE 1, the automatic device comprises a supporting column 1 anchored in the floor by means of a bed 2 and formed with a curved upper extension 3 carrying inclined stationary piston feeding ramps 4 and 10 which are laterally offset from one another and joined by an intermediate stationary slideway 4¹ (FIGURE 2²) extending between the bottom of the ramp 4 and the top of ramp 10, and an inclined stationary ramp 5 for delivering pistons machined in a conventional piston lathe, shown in phantom lines.

A piston-sorting device (FIGURE 1) is provided and to which a vertical reciprocating motion is imparted; this device consisting of two screens 6, 7 mounted on arms 8, 9.

The pistons are selected one by one at station S by the aforesaid sorting device on the feed ramp 4 and continue their travel at the proper velocity, after a horizontal lateral shifting movement along slideway 4¹ produced by means of a push member 41 (FIGURE 2). Thus, the piston is located on the ramp 10 provided with a longitudinal rail 10¹ (FIGURE 2²) along which the piston slides, the piston resting on one of the flat-bottomed recesses formed therein for clearing the ends of the piston pin. As the piston stops in the cavity or supply station 42, an overlying finger 11 provided with a stop collar 12 engages the piston-pin hole to ascertain, on the one hand, the presence of the piston and, on the other hand, the presence of the piston-pin hole.

The purpose of this finger 11 is also to properly position the piston in view of its subsequent engagement in the lathe.

On one side of the automatic device, as shown in FIGURES 2, 2¹ and 2², is provided a pushing assembly 19. This assembly comprises the push member 41 for shifting a piston to be machined waiting at the transfer station along the slideway 4¹ to the top of ramp 10, a push member 20 for introducing by axial displacement piston A at the supply station 42 into holder 16, a push member 21 for ejecting by axial displacement piston B in a holder 16¹ to the delivery station at the top of ramp 5, and a hydraulic control cylinder 22 having a rod 22¹ operatively connected to the pusher members 20, 21 and 41 through the intermediary of a transverse bar 22² and rods 22³, 22⁴ and 22⁵.

The screens 6, 7 are actuated by means of a pneumatic cylinder 50 controlled by a solenoid valve (not shown) and finger 11 is actuated by means of a pneumatic cylinder 60 also controlled by a solenoid valve (not shown).

The curved arm of the supporting column 1 has mounted thereon a moveable arm 13 secured through its hub 13¹ (FIGURES 3, 4) on a shaft 14 which is adapted to pivot in the column 1. This moveable arm 13 carries at its outer or free end a double holder assembly 16, 16¹ which is rotatably mounted in such end. The mechanism whereby the rotational movements of the holder 16, 16¹ in the end portion of the arm 13 are obtained is as follows:

A fluid-actuated cylinder 40 (FIGURE 3) mounted parallel on the arm 13 and rigid therewith has a piston rod provided with a toothed rack 31 meshing with a spur pinion 32 keyed on a pin 34 which is journalled for rotation in a bearing supported in a flange 34¹. The pin 34 has keyed on its free end a bevel pinion 33 in meshing engagement with another bevel pinion 35 carried by a shaft 36 mounted in the moveable arm 13; the outer end of this shaft 36 carries in turn a bevel pinion 37 meshing with the bevel pinion 38 carried by a shaft 39 which is rotatably mounted in a bearing carried by a housing 39¹ at the other end of the moveable arm 13. Finally, this shaft 39 has rigidly mounted thereon the double holder device 16, 16¹.

The up and downward movements of the arm 13 are controlled by means of another fluid-actuated cylinder 43 secured on the column 1 and provided with a rod 25 having its upper end pivotally connected to a lever 26 keyed on the shaft 14. From the foregoing it will be readily understood that the movements of the rod 25, which are caused by the actuation of the cylinder 43, will rotate the shaft 14 and, consequently, the moveable arm 13.

A pair of cams 29, 30 are carried by and are rigid with the shaft 14. The cams are engaged by followers 27¹, 28¹ adapted to actuate corresponding solenoid valves 27, 28 (FIGURE 4) which are fixed relative to the column 1 and which control the cylinder 43 in a known manner. These cams 29, 30, therefore, serve to limit the angular displacements of the arm 13 which, during the final portion of its up or downward movement, will further engage suitably placed stop members.

When the arm 13 is in its upper position, it is held against movement so that the holder 16, 16¹ will then register with the remaining cavities formed at the ends of the feed and delivery ramps 10 and 5, respectively (see FIGURES 2 and 5).

The control of the device described hereinabove is completed by a number of contact-operated electric switches 51, 52, 53, 54 and 55 which are mounted on the lathe and on the automatic device as illustrated diagrammatically in FIGURES 1 and 2.

The operation of the device is as follows:

During machining of a piston, the arm 13 is in its uppermost position. The holder 16¹ is positioned in register with the supply station 42 from which it receives a piston A to be machined under the action of the pusher 20, and the holder 16 is positioned in register with the delivery station at the top of ramp 5 where a machined piston B is ejected from the holder 16 by pusher 21. At the same time, a piston held between the screens 6 and 7 at the transfer station S, is being shifted under the action of the pusher 41 from the bottom of the ramp 4 to the top of the ramp 10 along the intermediate horizontal slideway 4¹, the pushers 20, 21 and 41 being simultaneously operated by cylinder 22. Once the piston, shifted by the pusher 41, has reached the top of the ramp 10, this piston will begin to roll down the ramp until one of the two flat bottomed-recesses formed therein for the piston pin clips engages the rail 10¹ which prevents further rotation of the piston and causes the latter to slide therealong. At the end of the rail 10¹, the piston rolls ino the cavity 42 defining the supply station from which the piston A has previously been transferred to the holder 16¹. The end of the rail 10¹ is so positioned in relation to the cavity 42, that the piston can carry out only half a turn so that the other of the two flat-bottomed recesses and the hole formed therein for the piston pin are located directly beneath the overlying finger 11 which is actuated by cylinder 60 to determine the presence of the piston.

Moreover, upon completion of the working stroke of pushers 20, 21 and 41, i.e., upon ejection of the machined piston B from the holder 16 and upon introduction of the piston A into the holder 16¹, the pushing assembly 19 actuates a solenoid valve 24 which causes the return movement of the pushing assembly and causes the holder assembly to rotate through half a turn by means of the cylinder 40. The holders 16 and 16¹ thus now occupy one another's previous positions.

When the machining operation in progress has been completed, the tool-holder 56 is retracted and actuates the switch 51 (FIGURE 1). This switch causes energization of the solenoid valve 28 controlling in turn the downward movement of the arm 13 by means of the cylinder 43; as the arm 13 completes its downward movement, the cam 30 actuates the follower 28¹ to cause de-energization of the solenoid valve 28 bringing the arm 13 to a stop, the empty holder 16 straddling the spindle of the tailstock 58 next to the machined piston which is to be removed from the lathe.

Upon completing its downward movement, the arm 13 actuates the switch 52 which initiates joint axial displacement of the headstock 57 and of the tailstock 58 in the direction of arrow F¹ in the conventional operation of the lathe until the machined piston, held by the spindles of the headstock and tailstock, is introduced into the empty holder 16 with which it is in register, whereafter the headstock, under actuation by a suitable reversing means (not shown) such as a switch, moves back to some extent, short of its starting position, i.e., short of the switch 54, while the tailstock 58 continues to travel in the direction of arrow F¹ until it reaches a position in which it actuates the switch 53.

This switch operates the cylinder 40, which rotates, via rack 31 and parts 32 to 39, the holder assembly through 180°, unimpeded by the spindles of the headstock 57 and tailstock 58 which have been withdrawn, so as to bring the piston A held by holder 16¹ in axial alignment with the headstock and tailstock spindles. Upon completion of this half-turn by the holder assembly, the rack 31 actuates, upon completion of its downward motion, a contact-operated electric switch 59 which initiates movement of the tailstock 58 in the direction of arrow F. The tailstock spindle engages piston A held by holder 16¹ and pushes it axially towards the spindle of the stationary headstock 57 which it engages, whereupon the headstock 57 will also move, in unison with tailstock 58, in the direction of arrow F whereby the piston is fully ejected from holder 16¹ and can be brought into its machining position. When this position has been reached, the headstock 57 actuates switch 54 which causes energization of the solenoid valve 27 which in turn initiates upward movement of the arm 13 by the cylinder 43.

At the end of this upward movement the cam 29 actuates the follower 27¹ to cause de-energization of the solenoid valve 27 bringing the arm 13 to a stop with the holders 16 and 16¹ in register with their respective delivery and supply stations, and the arm 13 actuates the switch 55, for example by means of a projection 61, thereby energizing the solenoid valve 23 which initiates a working stroke of the pusher assembly 19 whereby a fresh piston to be machined is transferred from the charging station 42 to the empty holder 16¹ by the pusher 20 and the machined piston held by the holder 16 is transferred to the top of ramp 5 by the pusher 21. At the same time, pusher 41 transfers a piston at the transfer station S from the bottom of ramp 4 to the top of ramp 10 along a slideway 4¹. Upon completion of this working stroke, the transverse bar 22² actuates a switch which de-energizes the solenoid valve 23 and energizes the solenoid valve 24 for the return movement or idle stroke of the pusher assembly 19 and for rotation of the holders 16 and 16¹ through 180°. The cycle of operation will then proceed as previously described.

Of course, the automatic device is also applicable to other machining operations, with such modifications as may be necessary for particular application. It is evident that the device enables the automatic location on a machine-tool, and in the proper machining position, of a continuous series of workpieces, to have a certain operation performed thereon and subsequently removing these workpieces, all the movements of the device being synchronized or effected with the proper time relationship under the control of the displacements of thet ool-carriage of the lathe or by causing certain members to engage limit-switches or like contacts operating in turn suitable remote control means.

What I claim is:

1. A workpiece feeding and removing device for a machine tool comprising a stationary feed ramp having an outlet end having open sides and in which a workpiece rests for sliding movement laterally thereof, a stationary delivery ramp disposed below the feed ramp and having an inlet end disposed below and vertically offset from the outlet end and having open sides for the sliding movement of a workpiece laterally onto the inlet end, a support pivotally mounted and swingably disposed in a vertical plane, an arm rotatably mounted on the support and movable about an axis transverse to the ramps, said arm having rigid workpieces holders provided on its opposing ends and selectively laterally alignable with the inlet and the outlet ends and interposed between such ends, means for moving a workpiece from the outlet end onto one of the holders and simultaneously moving a workpiece from the other holder onto the inlet end and means for swinging the support between a position in which the arm is interposed between the inlet and the outlet ends and a position for delivery of a workpiece to and removal of a workpiece from a machine tool.

2. A workpiece feeding and removing device for a machine tool comprising a stationary feed ramp having an outlet end having open sides and in which a workpiece rests for sliding movement laterally thereof, a stationary delivery ramp disposed below the feed ramp and having an inlet end disposed below and vertically offset from the outlet end and having open sides for the sliding movement of a workpiece laterally onto the inlet end, a support pivotally mounted and swingably disposed in a vertical plane, an arm rotatably mounted on the support and movable about an axis transverse to the ramps, said arm having rigid workpiece holders provided on its opposing ends and selectively laterally alignable with the inlet and the outlet ends and interposed between such ends, means for moving a workpiece from the outlet end onto one of the holders and simultaneously moving a workpiece from the other holder onto the inlet end and means for swinging the support between a position in which the arm is interposed between the inlet and the outlet ends and a position for delivery of a workpiece to and removal of a workpiece from a machine tool, said means for moving a workpiece from the outlet end onto one of the holders and from the other holder onto the inlet end including a hydraulically controlled pusher unit having vertically spaced, horizontally disposed and rectilinearly moving pusher rods disposed laterally of the feed ramp and movable laterally toward the inlet and the outlet ends.

3. A workpiece feeding and removing device for a machine tool comprising a stationary feed ramp having an outlet end having open sides and in which a workpiece rests for sliding movement laterally thereof, a stationary delivery ramp disposed below the feed ramp and having an inlet end disposed below and vertically offset from the outlet end and having open sides for the sliding movement of a workpiece laterally onto the inlet end, a support pivotally mounted and swingably disposed in a vertical plane, an arm rotatably mounted on the support and movable about an axis transverse to the ramps, said arm having rigid workpiece holders provided on its opposing ends and selectively laterally alignable with the inlet and the outlet ends and interposed between such ends, means for moving a workpiece from the outlet end onto one of the holders and simultaneously moving a workpiece from the other holder onto the inlet end and means for swinging the support between a position in which the arm is interposed between the inlet and the outlet ends and a position for delivery of a workpiece to and removal of a workpiece from a machine tool, said last means including a base, means pivotally mounting the support on the base for vertical swinging movement, a hydraulic cylinder, including a piston rod, carried by the base and a linkage connected between the support and the piston rod for swinging the support in a curvilinear path.

4. A workpiece feeding and removing device for a machine tool comprising a stationary feed ramp having an outlet end having open sides and in which a workpiece rests for sliding movement laterally thereof, a stationary delivery ramp disposed below the feed ramp and having an inlet end disposed below and vertically offset from the outlet end and having open sides for the sliding movement of a workpiece laterally onto the inlet end, a support pivotally mounted and swingably disposed in a vertical plane, an arm rotatably mounted on the support and movable about an axis transverse to the ramps, said arm having rigid workpiece holders provided on its opposing ends and selectively laterally alignable with the inlet and the outlet ends and interposed between such ends, means for moving a workpiece from the outlet end onto one of the holders and simultaneously moving a workpiece from the other holder onto the inlet end and means for swinging the support between a position in which the arm is interposed between the inlet and the outlet ends and a position for delivery of a workpiece to and removal of a workpiece from a machine tool, and means for rotating the arm so as to selectively align the holders with the inlet and outlet ends and including a shaft rotatably journalled axially in the support, a hydraulic cylinder carried by the support, means actuated by said cylinder and connected between the cylinder and the shaft for rotating the shaft and means connected between the shaft and the arm for transmitting the rotation of the shaft to the arm.

5. A workpiece feeding and removing device for a machine tool comprising a stationary feed ramp having an outlet end having open sides and in which a workpiece rests for sliding movement laterally thereof, a stationary delivery ramp disposed below the feed ramp and having an inlet end disposed below and vertically offset from the outlet end and having open sides for the sliding movement of a workpiece laterally onto the inlet end, a support pivotally mounted and swingably disposed in a vertical plane, an arm rotatably mounted on the support and movable about an axis transverse to the ramps, said arm having rigid workpiece holders provided on its opposing ends and selectively laterally alignable wtih the inlet and the outlet ends and interposed between such ends, means for moving a workpiece from the outlet onto one of the holders and simultaneously moving a workpiece from the other holder onto the inlet end and means for swinging the support between a position in which the arm is interposed between the inlet and the outlet ends and a position for delivery of a workpiece to and removal of a workpiece from a machine tool and means operatively mounted on the feed ramp, which contains a supply of workpieces, for feeding the workpieces one by one onto the outlet end.

6. A workpiece feeding and removing device for a machine tool comprising a stationary feed ramp having an outlet end having open sides and in which a workpiece rests for sliding movement laterally thereof, a stationary delivery ramp disposed below the feed ramp and having an inlet end disposed below and vertically offset from the outlet end and having open sides for the sliding movement of a workpiece laterally onto the inlet end, a support pivotally mounted and swingably disposed in a vertical plane, an arm rotatably mounted on the support and movable about an axis transverse to the ramps, said arm having rigid workpiece holders provided on its opposing ends and selectively laterally alignable with the inlet and outlet ends and interposed between such ends, means for moving a workpiece from the outlet end onto one of the holders and simultaneously moving a workpiece from the other holder onto the inlet end and means for swinging the support between a position in which the arm is interposed between the inlet and the outlet ends and a position for delivery of a workpiece to and removal of a workpiece from a machine tool, and means mounted over the outlet end for locating the workpieces in proper position on said end so as to be properly placed onto one of the holders for delivery to a machine tool.

7. A workpiece feeding and removing device for a machine tool comprising an inclined stationary feed ramp having a lower outlet end, a stationary inclined delivery ramp disposed below the feed ramp and having an upper inlet end disposed below and vertically offset from the outlet end, said ends having open sides for the lateral movement of workpieces onto and from the ends, a support mounted for swinging movement toward and away from an adjacent machine tool, means for swinging the support relative to the ramps and their ends and the machine tool, an arm rotatably carried by the support for rotation about an axis transverse to the ramps, rigid workpiece holders provided on the ends of the arm, said arm being interposed by the support between the inlet and the outlet ends of the ramps and the holders being laterally alignable with the ends, pusher means disposed laterally of the feed ramp and having pusher elements movable laterally of the outlet and the inlet ends and means for moving the pusher elements to push a workpiece from the outlet end onto one holder and simultaneously push a machined workpiece from the other holder onto the inlet end and means carried by the support for rotating the arm.

8. A device, as claimed in claim 7, wherein means is provided adjacent the machine tool for rotating the arm and locating the holders relative to the machine tool and for moving the workpiece from the one holder onto the machine and moving a machined workpiece from the machine onto the other holder.

9. A device, as claimed in claim 7, wherein said workpieces are engine pistons formed with piston pin holes, means for feeding the pistons one by one onto the outlet end so that their flat portions are located in substantially horizontal planes and means overlying the outlet end for engaging the holes in the pistons and thus locating them properly on the outlet end.

10. A device, as claimed in claim 7, wherein vertically reciprocating screens are mounted for vertical movement upwardly and downwardly of the feed ramp to feed the workpieces in one by one successive fashion along the feed ramp onto the outlet end.

11. A device, as claimed in claim 7, wherein control means for the timed operation of the means for swinging the support and means for rotating the arm and the means for moving the pusher elements are provided, said control means being synchronized with the operation of the machine tool.

References Cited in the file of this patent

UNITED STATES PATENTS

| | | |
|---|---|---|
| 394,170 | Graham | Dec. 11, 1888 |
| 1,008,429 | Osmer | Nov. 14, 1911 |
| 1,794,424 | Smith et al. | Mar. 3, 1931 |
| 1,974,837 | Shillinger | Sept. 25, 1934 |